May 2, 1933.  R. BURNS  1,906,366
FOOT BRAKE ATTACHMENT
Filed Nov. 17, 1932    2 Sheets-Sheet 1
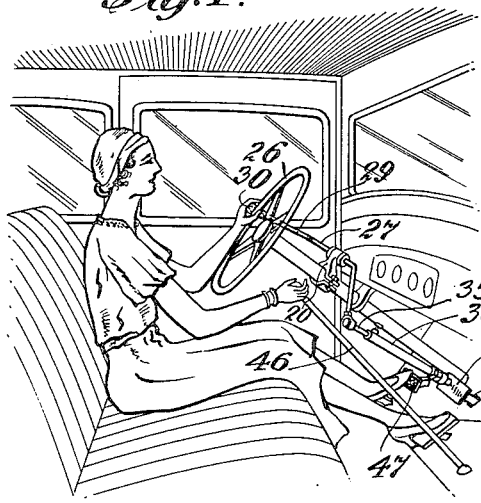
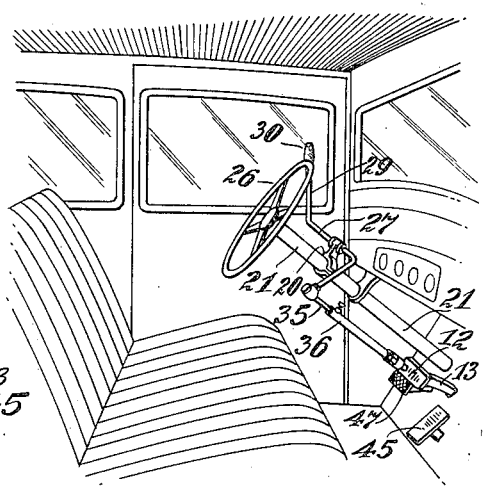
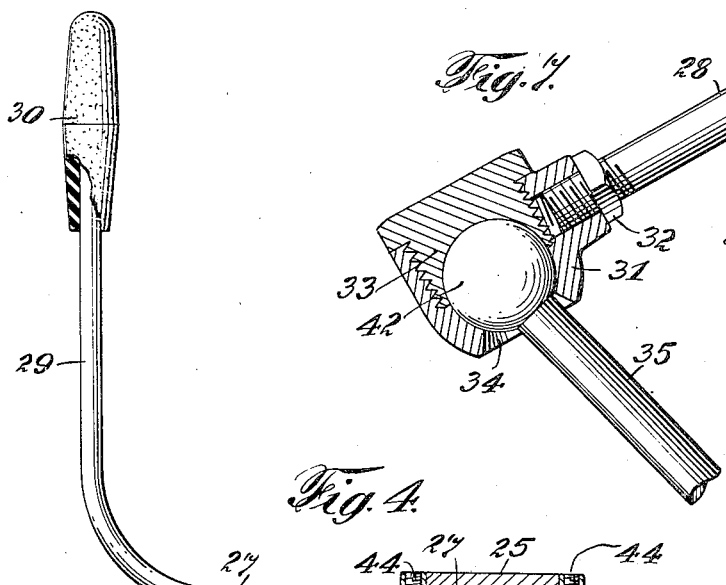
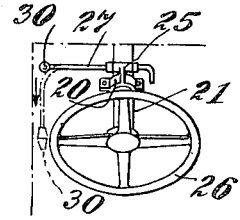
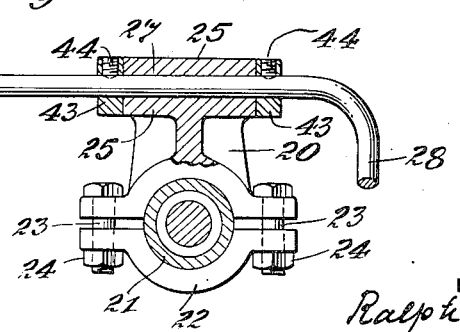
INVENTOR-
Ralph Burns
BY
ATTORNEY- May 2, 1933.  R. BURNS  1,906,366
FOOT BRAKE ATTACHMENT
Filed Nov. 17, 1932  2 Sheets-Sheet 2
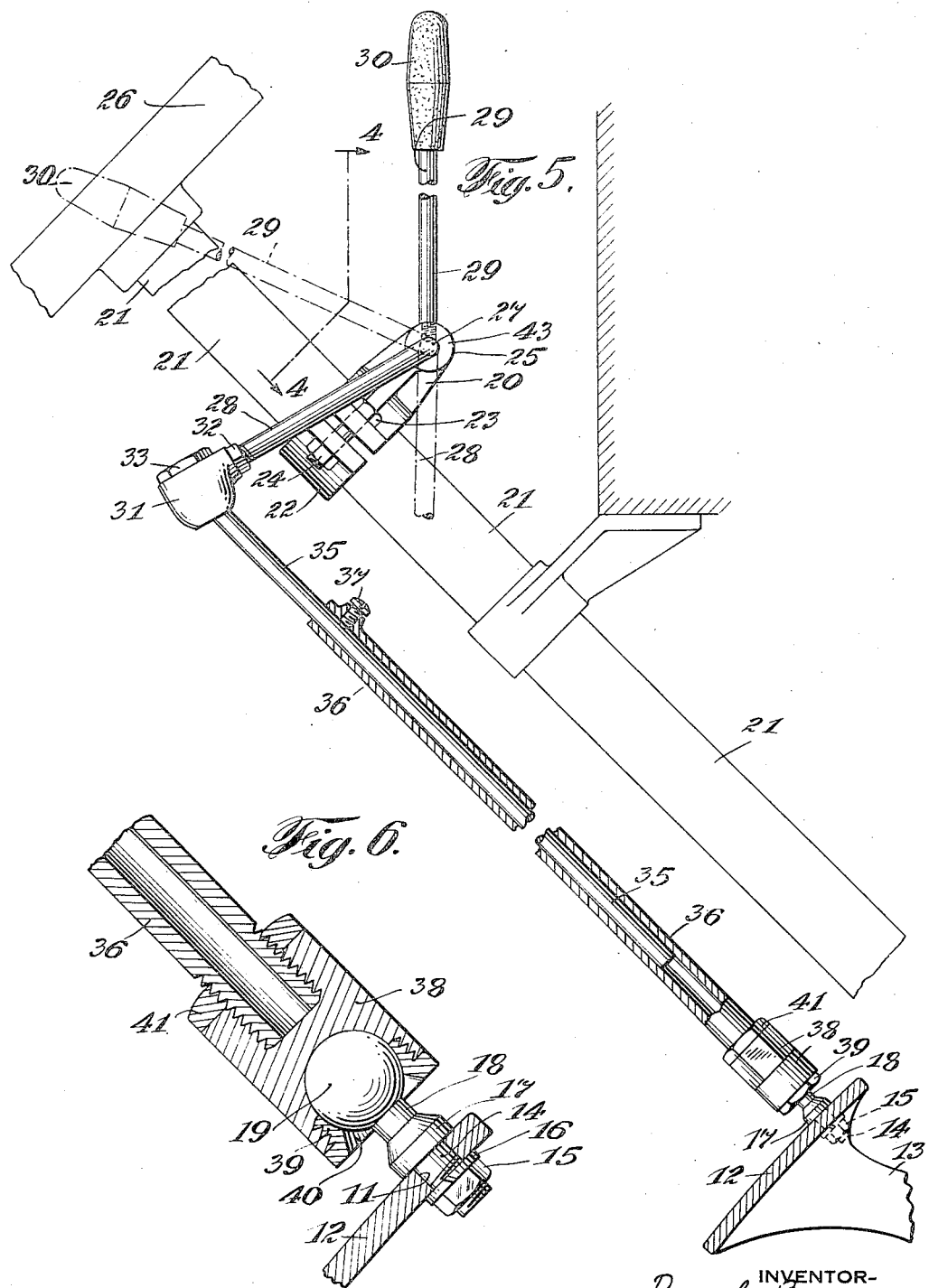

Patented May 2, 1933

1,906,366

UNITED STATES PATENT OFFICE

RALPH BURNS, OF BROOKLYN, NEW YORK

FOOT BRAKE ATTACHMENT

Application filed November 17, 1932. Serial No. 642,990.

The foot brake attachment of my invention is in the nature of a safety device for controlling the foot brake of an automobile.

In starting a stopped car, the foot of the driver must be removed from the brake pedal for use upon the accelerator pedal. With no other control, when the foot is removed from the brake pedal, the car is likely to roll either forward or backward, particularly on an incline or a hill, before the accelerator can become effective. Also the attempt to shift the foot as quickly as possible from the foot brake to the accelerator often results in too much pressure on the accelerator, which causes the car to leap forward with a jerk. As a makeshift for overcoming these troubles, drivers, stopped on a hill, have been compelled to use the hand operated emergency brake. This is not only inconvenient, by reason of the many motions required of the foot and hand, but the right hand then being in use on the lever of the emergency brake, is not free, as it should then be for operating the gear shift lever, for changing into first or high speed. Under such above noted prevailing conditions, the car can not be handled with facility and accidents are liable to, and do, occur.

With the controlling device provided by the foot brake attachment of my invention, as soon as the foot brake has been applied in the usual way, the foot may be removed from the brake pedal and placed in readiness for use upon the accelerator pedal, the device of my invention then being brought into use for holding the foot brake in its set position and providing for its release at just the proper time, which may take place while the accelerator is being operated by means of the foot.

In an embodiment of my invention, a lever and link arrangement may be connected to the foot brake pedal to be operated thereby when the brake is applied so as to bring the handle of a controlling lever, from a point sufficiently removed from the steering wheel to be entirely out of the way in steering, to a point immediately adjacent to the left hand side of the steering wheel, where, as has been found, it can be conveniently and easily held by means of one or more fingers of the left hand while this hand still grasps the steering wheel. This holding of the controlling lever holds the brake pedal to prevent the release of the foot brake until desired, at which time it is only necessary to release the hand from the handle of the controlling lever. This manner of operation is convenient, since in operating a motor car the left hand is never used except for steering while the car is in motion. The right hand being unoccupied may be placed in readiness for operating the gear shift lever.

The device of my invention has been especially devised not only to provide a simple and economical construction, easy to install, convenient in use and entirely effective in operation, but so as to embody simple adjusting means by which it is rendered capable of easy installation and fully effective use on any automobile now manufactured, merely by easily made adjustments when making the installation.

More particularly, in carrying out my invention in a practically workable device, it may comprise the following principal co-operating elements. A longitudinally adjustable operating link extends substantially alongside of the steering post somewhat to the right and rear thereof and at its lower end is pivotally connected to the foot brake pedal, to partake of the movement of the latter, by means of a universal joint. A transversely horizontal bearing below the steering wheel at the front of the steering post is carried by a supporting bracket which is adjustable along the steering post and is fixed thereon at the proper position of adjustment. A brake-controlling lever is pivoted for rocking movement in this bearing. This controlling lever has an arm which extends rearwardly at the right side of the steering post, with the rear end of this arm pivotally connected to the upper end of the longitudinally adjustable operating link, by means of a universal joint. At the left side of the steering post, the controlling lever has an upstanding handle arm, the handle end of which clears the steering wheel at the left side thereof.

My invention also includes various features of construction and combinations of parts, as will appear from the following particular description.

My invention will be further described with reference to the accompanying drawings illustrating one form thereof and in which similar parts are designated by similar reference numerals.

Figure 1 is a perspective view showing an installed embodiment of my invention, with the foot brake set.

Figure 2 is a similar view, with the foot brake released.

Figure 3 is a plan view from above the steering wheel as viewed in Figure 2, with broken lines indicating the position of the controlling lever shown in Figure 1.

Figure 4 is a transverse section on the bent line 4—4 of Figure 5, partly in section at a lower plane and with parts broken away.

Figure 5 is an enlarged side view, with parts broken out and with some parts in vertical section, with the foot brake released as in Figure 2, the set condition of the foot brake corresponding with Figure 1 being indicated by the broken-line position of the controlling lever in Figure 5.

Figure 6 is a further enlarged partial vertical section showing the pivot joint connection of the lower end of the brake-controlling link with the pedal of the foot brake.

Figure 7 is a similar view showing the pivotal connection of the upper end of the brake-controlling link to the lower rearwardly extending end of the controlling lever.

It is to be understood that the scope of the appended claims is not necessarily limited by the following particular description of the specific embodiment of my invention which has been illustrated in the accompanying drawings as one example of a practical construction by means of which the principle of my invention may be effectively carried out. With this in mind, the following description will be directed to the construction of the device of my invention as shown in the drawings with sufficient particularity to afford a clear understanding of its features and its manner of operation.

Preparatory to installing the illustrated device of my invention on a motor car, a hole 11 is drilled through the foot brake pedal tread plate 12 at its left margin, desirably adjacent to its upper edge. The tread plate 12 is carried on the outer end of a usual brake pedal stem 13 which passes out forwardly and downwardly through the usual inclined foot board of the car. As is well known, when the pedal plate 12 is depressed, the brakes are applied, and when this plate is set free, it automatically rises as the brakes are automatically released.

The pedal plate 12 carries an outwardly projecting stud having a bolt portion 14 passing through the hole 11 and firmly and securely held in place by means of a nut 15 screwed against a lock washer 16 at the back of the tread plate 12. This stud has a shoulder portion 17 which forms a head for the bolt portion 14 at the front face of the tread plate 12. This stud has a stem portion 18 extending from its head 17 in axial alignment with its bolt portion 14. This stem 18 terminates outwardly in a spherical head 19 which forms the ball element of a universal joint of the ball and socket type, the socket element of which will be described later.

A forwardly extending supporting bracket 20 is fixedly clamped on the steering post 21 by means of a rear clamp plate 22 and clamping bolts 23, 23 which are shown as provided with nuts 24, 24. The front end of this bracket 20 carries a horizontal transverse bearing 25 which is shown as formed all in one piece with the bracket 20. Thus it will be clear that by means of the clamped bracket 20 the bearing 25 may be adjustably fixed on the steering post 21 at the proper spaced distance below the steering wheel 26, which is required regardless of the length of the steering post 21, for reasons which will be set forth later.

A two-armed brake-controlling lever which in form and effect is substantially a bellcrank lever is shown as comprising a one-piece bent rod. This controlling lever has a shaft portion 27 pivotally journaled in the bearing 25, beyond which it extends horizontally for some distance to the left and for a less distance to the right. A rear arm 28 of this lever extends in a vertical plane transversely of the steering post 21 to the rear thereof at the right side. An upstanding handle arm 29 of this lever is shown as provided at its upper end with a handle or finger grip 30. The finger grip 30 is in a vertical plane beyond but adjacent to the left edge of the steering wheel 26, and the handle arm 29 itself is shown as extending in the same vertical plane. Normally the handle arm 29 is in a substantially vertical position, as will be seen from Figures 2, 3, 4, and 5, with the finger grip 30 spaced some distance forwardly and to the left of the steering wheel 26, so that both the handle arm 29 and its handle 30 are entirely out of the way for the unobstructed operation of the steering wheel 26 in driving the car.

At its rear end the rear arm 28 of the controlling lever carries a two-part socket providing internal spherical bearing surfaces. A lower main member 31 of this socket is shown as screwed onto the end of the arm 28 and locked by means of a jam nut 32. Another socket member 33 in the form of a plug is screwed into the socket member 31 from the top, forming a top closure for the socket. The opening in the socket member 31 into which the socket top 33 is screwed is of slightly larger diameter than the spherical socket cavity and extends down to a plane diametrical with such cavity. At its lower side the lower socket member 31 has through it an outwardly flaring opening 34. These two socket members 31 and 33 together form the socket element of a universal joint of the ball and socket type, the ball element of which will be described later.

A two-part operating link of adjustable length pivotally connects the ball head 19 on the foot brake pedal plate 12 with the socket formed by the members 31 and 33 carried by the rear arm 28 of the controlling lever. This link is shown as comprising an upper rod part 35 which is telescoped into a lower tubular part or pipe 36. These two link parts are securely held in longitudinally adjusted position relatively to each other by means of a set screw 37 screwed in against the rod 35 through the pipe 36 adjacent its upper end. The telescoping relation of the rod 35 and pipe 36 strengthen and stiffen the operating link as a whole.

A two-part socket element is carried by the lower end of the tubular part 36 of the operating link, for effecting a universal joint pivotal attachment of such link with the foot brake pedal plate 12 by means of its ball head 19. This socket element has an upper main socket member 38 which is shown as screwed onto the lower end of the tubular part 36 of the operating link. Another socket member 39 in the form of a plug is screwed into the lower end of the upper socket member 38 and has through it an outwardly flaring opening 40. Half of the spherical socket cavity for the ball head 19 is formed in the upper socket member and the other half in the plug member 39, which is of sufficient diameter for that purpose. The flaring opening 40 provides for the rocking therein of the ball stem 18, while the adjacent spherical inner surface of the plug member 39 prevents the escape of the ball 19 from its socket. The main socket member 38 is locked on the tubular part 36 of the operating link by means of a jam nut 41.

The upper end of the rod part 35 of the operating link is provided with a spherical head 42. This head 42 forms the ball element of a ball and socket universal joint of which the socket members 31 and 33 on the rear arm 28 of the controlling lever form the socket element. The flaring opening 34 provides for the relative rocking therein of the rod 35, escape of the ball 42 from its socket being prevented by the adjacent spherical inner surface of the main socket member 31.

In the installation of the foot brake controlling device of my invention as illustrated in the drawings, it will be noted that the operating link extends in general substantially parallel with steering column or post 21. However, in some other installation this operating link might be more or less inclined in any direction relatively to the steering post, since the above described ball and socket universal joint connections provide for this, in any case the major movements of the operating link being in the direction of its length.

It is to be noted that plenty of unobstructed foot room is left on the tread plate 12 of the foot brake pedal, the bolt 14 being near the left end of this pedal plate 12 is entirely out of the way of the foot.

When installing the device, the correct position of adjustment of the bearing bracket 20 along the steering post 21 may be readily determined by the position of the finger grip 30 relatively to the steering wheel 26, particularly in the rearward position of the handle arm 29, as shown in Figure 1 and as indicated by broken lines in Figures 3 and 5. The steering posts on different cars are often of different lengths. After the bracket 20 has been fixed in place, then the length of the operating link may be adjusted and fixed by means of the set screw 37.

The handle or finger grip 30 of the handle arm 29 of the controlling lever may be correctly positioned laterally relatively to the steering wheel 26 by slipping the shaft 27 through its bearing 25. This shaft 27 of the controlling lever is then secured against endwise shifting by means of collars 43, 43, thereon at the opposite ends of the bearing 25 and fixed to the shaft 27 by means of set screws 44, 44. It should be noted that, as a part in manufacture, the one-piece bearing 25 is slipped over the rod onto its shaft portion 27 before the rod is bent to form the rear lever arm 28.

Steering wheels are commonly of a standardized diameter. The longitudinally adjusted position of the shaft 27 in its bearing 25 is made such that the finger grip 30 will clear the steering wheel at the left by a desired short distance when the handle arm 29 of the controlling lever is swung rearwardly to its inclined position shown in Figure 1 and indicated by broken lines in Figures 3 and 5. Also the adjustment of the bearing bracket 20 on the steering post 21 is made such that the finger grip 30 will then project to the desired extent beyond the top of the steering wheel 26, as is shown in Figure 1 and indicated in Figure 5. The fingers of the left hand may thus grasp both the rim of the steering wheel 26 and the controlling lever handle 30 at the same time, for in this manner conveniently and easily holding the latter against forward brake-releasing movement.

The manner of operation is as follows:—

The car is brought to a stop in the usual way by pressure of the right foot on the tread plate 12, forcing this plate, together with its operating stem 13 forward and downward, whereby the foot brakes are applied. This movement of the tread plate draws the two locked together parts 35 and 36 of the inclined operating link longitudinally downward and forward, by means of the pivot joint ball 19. This movement of the operating link rocks the rear arm 28 of the controlling lever downward and slightly forward, by means of the pivot joint ball 42 on the upper end of the rod part 35 of the operating link. This rocks the controlling lever shaft 27 in its bearing 25 and thus swings the handle arm 29 rearward from its normal upright position, shown in full lines in Figures 2, 3, 4 and 5, to its rear inclined position shown in Figure 2 and indicated by broken lines in Figures 3 and 5.

A finger or fingers of the left hand, which may be resting upon or grasping the steering wheel 26 at the left, are then hooked over the finger grip 30 for holding it against forward movement. The right foot is then removed from the foot brake pedal plate 12 and placed above the usual accelerator pedal 45, in readiness to press upon it. When the foot is taken off the brake pedal 12 this pedal is then held down, with the brakes securely set, by means of the hold of the left hand on the controlling lever handle 30, it having been found in actual practice that this can easily be done, even with one finger. Thus the car can not roll, by gravity or otherwise. The free right hand is made ready for operating the usual gear shift lever 46, while at the same time the left foot is in position for use upon the usual clutch pedal 47.

In starting the car, the grip of the left hand on the handle 30 of the controlling lever is released at just the proper moment relatively to the depression of the accelerator pedal 45 by the right foot. When the handle 30 is released, the foot brakes are automatically released in the usual way, moving the brake pedal 12 back to its outwardly projecting normal position. This movement of the brake pedal 12 restores all parts of the brake controlling device of my invention to normal position, with the handle arm 29 together with its handle 30 moved forwardly away from the steering wheel 26 for the unobstructed use of the latter when the car begins to move.

It is obvious that various modifications may be made in the construction shown in the drawings and above particularly described, within the principle and scope of my invention as defined in the appended claims.

I do not limit myself to the particular size, shape, number or arrangement of parts as specifically shown and described, as these are given simply as a means for describing the device of my invention clearly.

What I claim is:—

1. A foot brake attachment for an automobile comprising a movable non-lockable device so mounted as to be held by the left hand of the driver with said device positively engaging with the depressed brake pedal and holding the latter against return movement for thereby manually holding the brakes in their set condition after the removal of the foot from said pedal, said device including an upstanding brake-controlling handle arm at the left of the steering wheel and pivoted for unobstructed freely swinging backward and forward movement and normally with said pedal and brakes released to occupy a position which leaves the steering wheel unobstructed and with the brakes applied by means of said pedal said handle arm then to swing to occupy a position immediately adjacent to the rim of the steering wheel at the left thereof so as then to be grasped and held by the left hand against movement.

2. In a foot brake attachment for an automobile, in combination, a longitudinally movable operating member in engagement with and extending from the brake pedal to a point below the steering wheel, and a bell-crank lever having a rearwardly extending arm in engagement with the upper end of said member and having an upstanding handle arm at the left of the steering wheel adjacent to the left hand of the driver with a normal forward position which leaves the steering wheel unobstructed and to swing rearwardly into proximity to the rim of the steering wheel at the left thereof so as then to be grasped and held by the left hand against forward movement, said engagement of said rearwardly extending arm with the upper end of said member and of the lower end of the latter with said brake pedal being such that thus holding said upstanding handle arm at its rearward position will positively hold said brake pedal at its depressed position with the brakes in a set condition.

3. In a foot brake attachment for an automobile, in combination, an operating link pivotally connected to the brake pedal and extending therefrom upwardly and rearwardly alongside the steering post to a point below the steering wheel, and a bell-crank lever having at the right of the steering post a rearwardly extending arm pivotally connected with the upper end of said link and having at the left of the steering post an upstanding handle arm at the left of the steering wheel.

4. In a foot brake attachment for an automobile, in combination, an operating link pivotally connected to the brake pedal and extending therefrom upwardly and rearwardly alongside the steering post to a point below the steering wheel, adjusting means providing for changing the length of said link, a bell-crank lever having at the right of the steering post a rearwardly extending arm pivotally connected to the upper end of said link and having at the left of the steering post an upstanding handle arm at the left of the steering wheel, a supporting bracket fixedly mounted on the steering post and having a bearing in which said lever is pivotally mounted, and adjusting means providing for fixing said bracket at different places along the length of the steering post.

5. In a foot brake attachment for an automobile, in combination, a longitudinally movable operating link to extend alongside the steering post in spaced relation from the right side thereof, a universal joint providing for connecting the lower end of said link with the brake pedal so that said pedal will impart movement to said link, a supporting bracket to be fixed on the steering post and provided with a horizontal transverse bearing to be disposed at the front of the steering post, a controlling lever pivoted in said bearing and having beyond the right end of said bearing a rearwardly extending arm, and a universal joint universally pivotally connecting the upper end of said link with rear end of said arm, the said controlling lever having beyond the left end of said bearing an upstanding handle arm to extend at the left of the steering wheel and normally to occupy a forward position to leave the steering wheel unobstructed and when the brakes are applied by means of said pedal said handle arm then to be swung thereby rearwardly to a position immediately adjacent to the left side of the steering wheel there to be held by the fingers of the left hand for thereby holding said pedal at its depressed position with the brakes held in their set condition after the removal of the foot from said pedal.

6. In a foot brake attachment for an automobile, in combination, a longitudinally movable operating link to extend alongside the steering post in spaced relation from the right side thereof, adjusting means providing for changing the length of said link, a universal joint providing for universally pivotally connecting the lower end of said link to the brake pedal so that said pedal will impart movement to said link, a supporting bracket to be fixedly mounted on the steering post and having a horizontal transverse bearing to be disposed at the front of the steering post, adjusting means providing for fixing said bracket at different positions along the length of the steering post, a controlling lever pivoted in said bearing and having beyond the right end of said bearing a rearwardly extending arm, and a universal joint universally pivotally connecting the upper end of said link to the rear end of said arm, the said controlling lever having beyond the left end of said bearing an upstanding handle arm to extend at the left of the steering wheel and normally with said pedal and brakes released to occupy a forward position for leaving the steering wheel unobstructed and with the brakes applied by means of said pedal said handle arm then to occupy a rearward position immediately adjacent to the left side of the steering wheel so as then to be held by the fingers of the left hand for thereby holding said pedal at its depressed position with the brakes held in their set condition after the removal of the foot from said pedal.

7. In a foot brake attachment for an automobile, in combination, a supporting bracket to be fixedly mounted on the steering post and having a horizontal transverse bearing to be positioned at the front of the steering post, clamping means for adjustably fixing said bracket on the steering post at a desired spaced distance thereon longitudinally thereof below the steering wheel, a rocking controlling lever having a shaft journaled in said bearing, an upstanding brake-controlling handle arm fixedly carried by said shaft beyond the left end of said bearing for unobstructed freely swinging backward and forward movement between a normal forward position which leaves the steering wheel unobstructed and a rearward position immediately adjacent to the steering wheel at the left so as then to be grasped and held by the left hand in the brake-controlling operation, a rearwardly extending operating arm fixedly carried by said shaft beyond the right end of said bearing, one element of a ball and socket joint fixed upon the rear end of said operating arm, one element of another ball and socket joint fixed upon the brake pedal, and a two-part operating link extending between and connecting together said joint elements; said link comprising a tubular part and a rod part telescoped together to form upper and lower link parts, clamping means for adjustably securing said link parts fixedly together, one element of a ball and socket joint fixed upon the upper end of said upper link part and forming a ball and socket joint connection with said joint element on said operating arm, and one element of another ball and socket joint fixed upon the lower end of said lower link part and forming a ball and socket joint connection with said joint element on the brake pedal; whereby when the brakes are applied by depressing said pedal said brake-controlling handle arm of the controlling lever will be swung rearwardly into position to be held
by the left hand against forward movement
so that then the foot may be removed from
the brake pedal while its depressed position
together with the set condition of the brakes
is maintained by the hand, and so that the
brakes may be subsequently released by releasing the grasp of the hand on said handle
arm and the latter will be returned forwardly to its normal position by the outward
brake-releasing movement of said pedal.

Signed at New York City in the county of
New York and State of New York this 14th
day of November, 1932.

RALPH BURNS.